(12) United States Patent
Stockmann

(10) Patent No.: US 8,013,781 B2
(45) Date of Patent: Sep. 6, 2011

(54) METHOD AND APPARATUS FOR RADAR SURVEILLANCE AND DETECTION OF SEA TARGETS

(75) Inventor: Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 267 days.

(21) Appl. No.: 12/237,093

(22) Filed: Sep. 24, 2008

(65) Prior Publication Data

US 2010/0073218 A1    Mar. 25, 2010

(51) Int. Cl.
  *G01S 7/292*    (2006.01)
  *G01S 7/02*    (2006.01)
  *G01S 13/00*    (2006.01)

(52) U.S. Cl. ............. 342/93; 342/27; 342/28; 342/89; 342/91; 342/159; 342/175; 342/194; 342/195

(58) Field of Classification Search .............. 342/21, 342/22, 27, 28, 89–103, 159–164, 175, 192–197
See application file for complete search history.

(56) References Cited

U.S. PATENT DOCUMENTS

| | | | | |
|---|---|---|---|---|
| 3,701,149 A * | 10/1972 | Patton et al. | ...................... | 342/93 |
| 3,761,922 A * | 9/1973 | Evans | ............................... | 342/93 |
| 3,778,822 A * | 12/1973 | Bauer | ............................... | 342/93 |
| 3,946,382 A * | 3/1976 | Kossiakoff et al. | ............. | 342/93 |
| 3,968,490 A * | 7/1976 | Gostin | ............................ | 342/93 |
| 3,995,270 A * | 11/1976 | Perry et al. | ....................... | 342/93 |
| 4,012,627 A * | 3/1977 | Antoniak | .......................... | 342/93 |
| 4,213,127 A * | 7/1980 | Cole | ................................. | 342/93 |
| 4,249,177 A * | 2/1981 | Chen | ................................ | 342/93 |
| 4,274,095 A * | 6/1981 | Phipps et al. | .................... | 342/93 |
| 4,488,154 A * | 12/1984 | Ward | .............................. | 342/162 |
| 4,489,319 A * | 12/1984 | Hansen | ............................ | 342/93 |
| 4,542,381 A * | 9/1985 | Wilhelm | .......................... | 342/93 |
| 4,586,043 A * | 4/1986 | Wolf | ................................. | 342/93 |
| 4,649,394 A * | 3/1987 | Minker et al. | ................... | 342/94 |

(Continued)

FOREIGN PATENT DOCUMENTS

WO    WO 2005096012 A1    10/2005

OTHER PUBLICATIONS

International Search report dated Nov. 25, 2009 for related PCT application No. PCT/US2009/058190.

*Primary Examiner* — Bernarr E Gregory
(74) *Attorney, Agent, or Firm* — Howard IP Law Group P.C.

(57) ABSTRACT

In a radar system using a radar clutter map comprising a plurality of range-azimuth cells containing parameter data values indicative of time averaged echo returns for affecting alarm threshold levels at range-azimuth locations scanned by the radar system antenna, a method for detecting comprising the steps of obtaining from the radar clutter map a first parameter data value associated with a given cell under test (CUT); determining a second parameter data value using parameter data values of other cells from the plurality of range-azimuth cells from the radar clutter map; comparing the first parameter data value associated with the CUT with the second parameter data value; and generating a signal indicative of a target detection when the first parameter data value exceeds the second parameter data value by a given threshold corresponding to a target false alarm rate.

20 Claims, 7 Drawing Sheets

U.S. PATENT DOCUMENTS

| | | | |
|---|---|---|---|
| 4,749,994 A * | 6/1988 | Taylor, Jr. | 342/195 |
| 4,970,660 A * | 11/1990 | Marchant | 342/90 |
| 5,021,791 A * | 6/1991 | Hurd | 342/93 |
| 5,038,145 A * | 8/1991 | DeCesare et al. | 342/93 |
| 5,179,712 A * | 1/1993 | Abboud | 342/93 |
| 5,337,055 A * | 8/1994 | Ghignoni | 342/93 |
| 5,499,030 A | 3/1996 | Wicks et al. | |
| 5,644,315 A * | 7/1997 | Long | 342/93 |
| 5,703,592 A * | 12/1997 | Watts | 342/93 |
| 5,764,182 A * | 6/1998 | Durand | 342/93 |
| 5,793,326 A * | 8/1998 | Hofele | 342/93 |
| 5,798,728 A * | 8/1998 | Tomishima et al. | 342/93 |
| 5,808,579 A * | 9/1998 | Rademacher | 342/93 |
| 5,949,368 A * | 9/1999 | DeCesare | 342/93 |
| 6,850,186 B2 * | 2/2005 | Hellsten | 342/93 |
| 7,286,079 B2 * | 10/2007 | Blunt et al. | 342/159 |
| 7,336,219 B1 * | 2/2008 | Lohmeier et al. | 342/159 |
| 7,642,951 B2 * | 1/2010 | Onorato | 342/93 |
| 2006/0232464 A1 * | 10/2006 | Onorato | 342/93 |
| 2006/0238408 A1 | 10/2006 | Blunt et al. | |
| 2006/0238412 A1 * | 10/2006 | Blunt et al. | 342/160 |

\* cited by examiner

METHOD AND APPARATUS FOR RADAR SURVEILLANCE AND DETECTION OF SEA TARGETS

FIELD OF INVENTION

The present invention relates to sea target detection with an air target surveillance radar using map based constant false alarm rate processing.

BACKGROUND OF THE INVENTION

Radar systems used for surveillance and tracking generally require some type of target processing for background estimation, detection threshold and constant false alarm control. In air target radars, this has typically been achieved with range-only constant false alarm rate ("CFAR") processing or range and velocity CFAR processing or "area CFAR."

Contemporary radars frequently accomplish the CFAR function with clutter maps containing running averages of received power for every multidimensional resolution cell, i.e. every range-azimuth-Doppler cell. The clutter map is then used to establish detection thresholds whereby new data is compared to the running average in each cell. In effect the compare process identifies target returns that have magnitudes above specified values when compared to a running average. A map-based CFAR threshold requires that a target have sufficient velocity to move it from resolution cell to resolution cell, from scan to scan. Although an air target is present only briefly within a given cell, it significantly contributes to the averaging process of the cell in which it is located. Generally, establishing cells sufficiently small allows air targets to have velocity sufficiently high to make the movement of the target progress from cell to cell from scan to scan. However, defining cells sufficiently small, to allow air targets to have velocity sufficiently high, fails for detection of hovering craft, such as helicopters, and most sea targets where the target velocity is relatively low or virtually zero. In this case, a clutter map actually averages, absorbs and reflects the target return, such that the target becomes its own background. This is known as "mapping out." Efforts to detect a hovering craft, using the relatively high Doppler responses from the rotating blades of a helicopter for example, simply do not generally succeed, because the blades map out with the fuselage. Based on the foregoing, a fundamental problem exists when using a map based CFAR detection for slow or non moving targets.

SUMMARY OF THE INVENTION

In a radar system that detects relatively fast moving targets using a radar clutter map comprising a plurality of range-azimuth cells containing parameter data values indicative of time averaged echo returns for affecting alarm threshold levels at range-azimuth locations scanned by the radar system antenna, a method for detecting relatively slow moving targets in a substantially homogeneous surveillance region, the method comprising the steps of obtaining from the radar clutter map a value corresponding to parameter data of a given cell under test (CUT); determining a second parameter data value using parameter data values of other cells from the plurality of range-azimuth cells from the radar clutter map; comparing the parameter data value of the CUT with the second parameter data value; and generating a signal indicative of a target detection when the CUT parameter data value exceeds the second parameter data value by a given threshold corresponding to a target false alarm rate.

This invention further includes in a system that detects relatively fast moving targets using a radar clutter map comprising a plurality of range-azimuth cells containing parameter data values indicative of time averaged echo returns for affecting alarm threshold levels at range-azimuth locations scanned by the radar system antenna, an apparatus for detecting relatively slow moving targets in a substantially homogeneous surveillance region comprising: a processor adapted to obtain from the radar clutter map a value corresponding to parameter data of a given cell under test (CUT), the processor including a logic unit that determines a second parameter data value using parameter data values of other cells from the plurality of range-azimuth cells from the radar clutter map; a comparator that compares the parameter data value of the CUT with the second parameter data value and generates a signal indicative of a target detection when the CUT parameter data value exceeds the second parameter data value by a given threshold corresponding to a target false alarm rate.

This invention further includes an apparatus having: (1) a processor for: (a) creating a map of measurements of a surrounding environment of the cell under test; (b) sorting selected measurements of a surrounding environment of the cell under test; (c) removing any selected measurement of the surrounding environment if the magnitude of the selected measurement is larger than a pre assigned value to prevent biasing the detection of the cells under test; (d) and averaging the measurements from the remaining selected measurements to create a sub estimate unbiased by one of either the cells under test or cells in the surrounding environment; and (2) a comparator for comparing the measurements derived from the cells under test against the sub estimate to detect the presence of a target within the surveillance region.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

The following description of the preferred embodiments is merely by way of example and is not intended to limit the invention or its application. The subject invention allows a conventional air target surveillance radar using prior art map based CFAR detection system to further detect slow or stationary targets on or hovering above a homogeneous surface such as a body of water. While preferred embodiments of the present invention are described with respect to slow or stationary targets on or hovering above the sea surface (sea targets), the present invention contemplates that sea targets further include those slow moving, non-moving and hovering targets on or above other homogeneous surfaces such as homogeneous desert sands, frozen Antarctic terrain or frozen water, and the like. Furthermore, while slow moving targets as described herein are typically surface craft, buoys, hovering helicopters, growler icebergs, periscopes and the like, it is further contemplated that targets may also include vegetation patches, migrating animals, and other such slow or non-moving targets disposed relative to homogeneous surfaces or regions.

The radar system in accordance with one embodiment of the invention allows a coastal location to become dual use, namely, detecting relatively fast moving targets (hereinafter referred to as air targets) in a primary mode and relatively slow moving targets on or over the water's surface (hereinafter referred to as maritime or sea targets) in a secondary mode. Target detections may be processed and combined from both modes. As an added feature the maritime targets are detected with a greater sensitivity than the air targets.

The present invention offers a means by which slow moving targets, even stationary targets, can be detected by air target radar while still employing a map based CFAR detection. Radar returns from a sea target (such as a surface ship on or hovering helicopter over the surface of the sea) are used to compute various statistics, such as average signal intensity or power levels. Note that a statistic computed from a sea clutter return in a range/Doppler map cell at one location is no different from a statistic computed from a nearby, but distinct location. Likewise, any statistics computed from wave and sea reflectivity may be different from one location (referred to as a cell) to a nearby location at any instant in time, but the differences are statistically insignificant when averaged over time. In this sense sea clutter statistics are ergodic, meaning that over time, one can observe spatially across a class of representative sea cells and find the same statistics as if one were looking at one sea cell versus time within the class.

Figure 1:
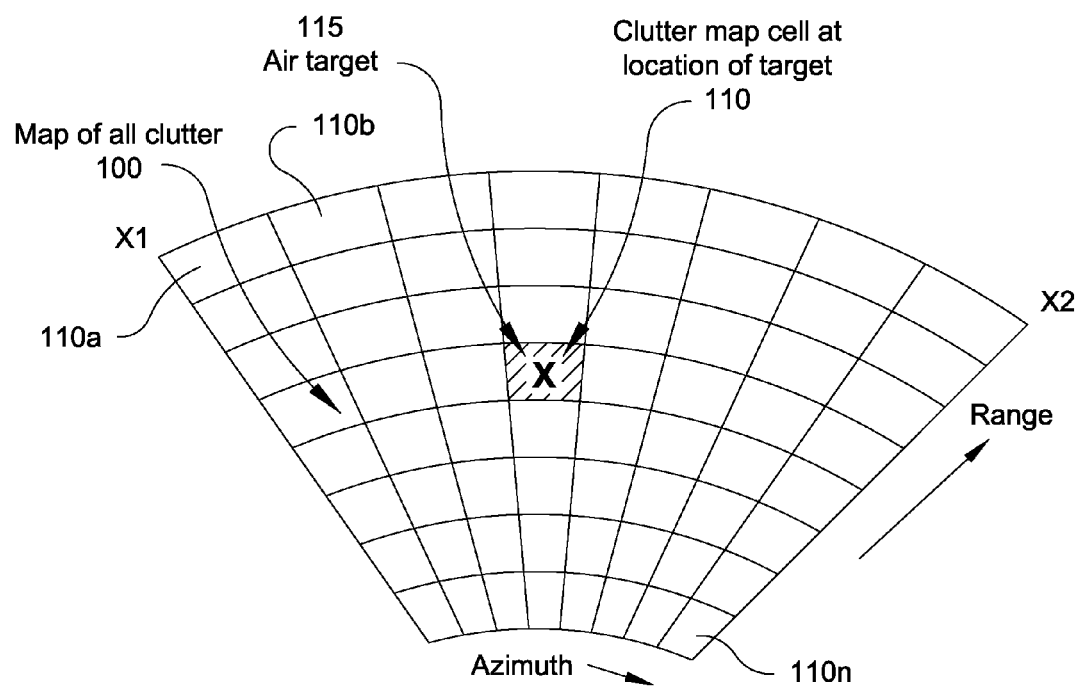
FIG. 1 illustrates a primary channel map based CFAR thresholding for detecting fast moving targets in accordance with the prior art.

FIG. 1 shows a portion of an exemplary single clutter map 100 for the typical primary air target channel in accordance with the prior art processing techniques for air target detection. Only an azimuth sector $X_1$-$X_2$ is shown, but it is understood that the clutter map may extend a full 360 degrees in azimuth. Clutter map 100 includes a cell 110 containing therein an air target 115 return. It is understood that each cell within clutter map 100 contains a Doppler bin, range, and azimuth component parameter that constitute each cell (e.g. cell 110). Air target 115 is detected as it passes through the cell 110 indicated herein as the cell under test (CUT). Air target detection is accomplished in CUT 110 by comparing the per scan return power from the target 115 to the running average for that range/azimuth of that same cell 110. It is widely understood in radar that a threshold is commonly established to have a false alarm rate that does not exceed about $10^{-7}$ per Doppler cell under test 110. CFAR radar achieves this with a threshold of about 12 dB or more above the background, regardless of how false alarm rate is estimated. The 12 dB margin is needed because of the fluctuation of the channel signal present as a result of the inclusion of noise and/or clutter. The clutter map 100 represents the result of a scan-to-scan averaging process of the return data, which materially reduces the fluctuation and approaches the average background power in each cell under test 110. Depending on the scan-to-scan smoothing rate, the fluctuation in the map from scan to scan is about 1.0 dB. If the per scan power is 12 dB above the running average, a detection is declared. The threshold for the particular cell under test 110 is based only on the running average for the cell under test 110.

Figure 2:
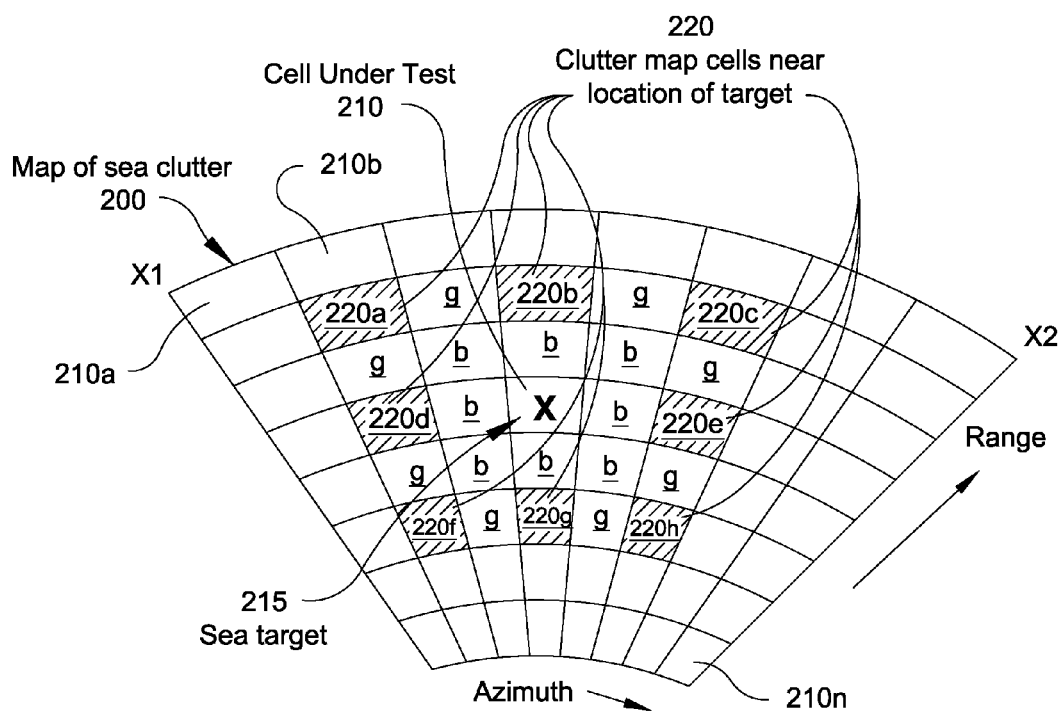
FIG. 2 illustrates a secondary channel map based CFAR thresholding for detecting slow or non moving targets according to an embodiment of the invention.

FIG. 2 shows a clutter map 200 useful for illustrating the processing associated with a secondary channel intended for sea target detection in accordance with an embodiment of the present invention. A slow moving target identified herein as a sea target labeled as 215 is disposed or positioned within cell 210 of clutter map 200 with azimuth sector $x_1$-$x_2$ defined by the boundaries of the sea coverage seen from the coastal location of a radar system. The radar clutter map 200 is representative of averaged radar return data. The averaged return data in the clutter map may be updated periodically (e.g. during each radar scan or every nth scan). The cells 210a, 210b, ..., 210n constituting the clutter map 200 and including cell 210 (identified herein as the cell under test) and neighboring cells 220 (identified as 220a, ..., 220h) each comprise one Doppler bin (and corresponding range/azimuth parameters) as is understood by one of ordinary skill in the arts. Detection of the sea target 215 in the cell under test 210 occurs when a map power at the cell under test location is compared to an average of the powers of nearby range/azimuth cells 220 and the comparison exceeds a predetermined threshold. By way of example and not limitation, if the per scan power of the background or average power of the particular cell under test exceeds the background or average power value of a selected set of neighboring or surrounding cells (220a, ... 220h) by a predetermined value (such as 3 dB greater for example), then a sea target detection is declared. In this manner, the average value of the power data in the cell under test taken from the clutter map is compared to a threshold that is based on averaging the average power data values of surrounding or neighboring cells taken from the clutter map, to determine a sea target detection. Such processing is not the conventional mode for radar detection according to the prior art techniques. In the prior art, it is the per scan received power (e.g. instantaneous power detected at the cell under test) that is thresholded and not the averaged map cell power itself. In this case, the relatively slow rate of change of a target across a cell becomes a factor in target detection.

Figure 3:
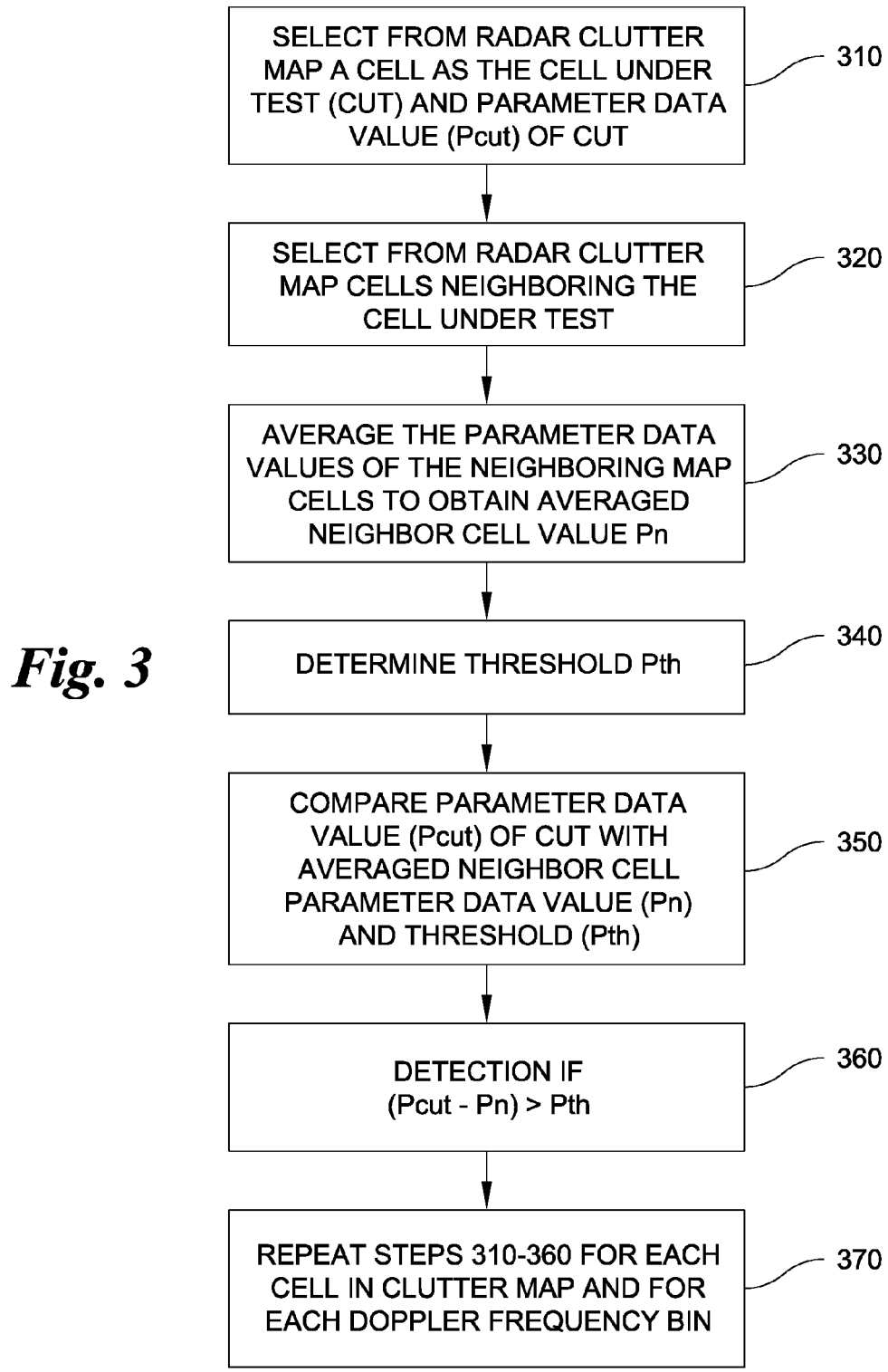
FIG. 3 illustrates a process flow for secondary CFAR thresholding according to an embodiment of the invention.

As illustrated in FIG. 3, one aspect of the invention relates to a method for detecting radar targets within a substantially homogeneous surveillance region by merely thresholding against nearby sea map locations, where the map magnitudes are not elevated by the presence of the sea target, i.e. the sea target no longer "maps out." This turns an air surveillance and tracking radar at a coastal location, for example, into a sea target radar, thus providing a dual use capability by adding to the clutter map thresholding logic.

A clutter map is formed to provide a cell mapping of a surveillance region. The clutter map may be formed by any number of various mapping techniques as known by those of ordinary skill in the art. In general, when an antenna beam of an antenna system scans across a surveillance region, a receiver receives the echo or return data from a series of pulses transmitted by the antenna at a given pulse repetition frequency (prf), and the data from each individual scan is accumulated and integrated such that for each Doppler bin (i.e. Doppler frequency) at a range/azimuth location the map cell represents the average (e.g. mean) radar return power. The present invention utilizes the clutter map typically generated as part of an air target radar's detection process for detecting fast moving targets, to further process and detect radar return data for determining the presence of sea targets using the same ground based radar (e.g. using the same environment hardware).

Referring to FIG. 3 with reference to the clutter map depicted in FIG. 2, a process flow for determining a sea target detection using a clutter map generated as part of a radar air target processing includes selecting (block 310) a given cell as the cell under test within the radar clutter map 200 (FIG. 2). The map cell under test may be selected automatically according to an algorithmic process based on the clutter map coordinates, by way of example only. Clutter map cells that neighbor the given cell under test (e.g. cells 220a, 220b, ... 220h) are then selected (block 320) and their average power values are averaged (block 330) to determine a parameter value $P_n$ for comparison with a parameter value $P_{CUT}$ of the clutter map cell under test. The parameter value $P_{CUT}$ of the clutter map cell under test represents the average power associated with the given CUT while the parameter value $P_n$ represents the averaged value of the neighboring cell average powers. A threshold value $P_{TH}$ above which a detection is declared is also determined (block 340). In an exemplary embodiment, the parameter values $P_n$, $P_{CUT}$ and $P_{TH}$ are stored and/or retrieved from memory locations within a storage device or memory residing within the radar system of the present invention. The parameter data values are compared (block 350) and if $P_{CUT}$ exceeds $P_n$ by a given threshold value $P_{TH}$, then the system identifies a target detection (block 360) for the given CUT associated with that clutter map cell location (range-azimuth-Doppler bin). Processing proceeds in the above fashion until the cells within the given clutter map (and corresponding to a particular Doppler frequency bin) are processed (block 370).

The selection of those neighboring clutter map cells that are to be utilized as part of the present processing method may be based, for example, on an algorithmic process wherein the nearest neighbor cells relative to the CUT are bypassed (e.g. those cells labeled "b" in FIG. 2) to provide a buffer or guard band between the selected neighbor cells and the CUT. Only a predetermined number of neighbor cells are selected, which selected cells form a substantially symmetrical arrangement (relative to the range/azimuth coordinates) and where each selected neighbor cell is separated from its nearest neighboring other selected cell by at least one non-selected cell (e.g. cells labeled "g" as shown in FIG. 2). The clutter map may be updated (and stored in memory) with recent parameter (e.g. power) values for each of the cell locations after completion of the above processing so as to not deleteriously impact the threshold detection determination.

By way of example, and not limitation, utilizing the invention as described by the process flow of FIG. 3, a gain in detection sensitivity of about 8 dB is realized. This 8 dB increase directly results in an ability to detect hovering or sea targets with a radar cross section 8 dB less than prior art detection methods. An 8 dB reduction in radar cross section generally represents a target about 6 times smaller than a target capable of detection using a prior art CFAR radar system. The subject invention therefore allows detection of slowly moving or stationary sea targets, such as hovering targets above the sea, which would otherwise map out, and does so in addition with about an 8 dB boost in sensitivity.

Figure 4:
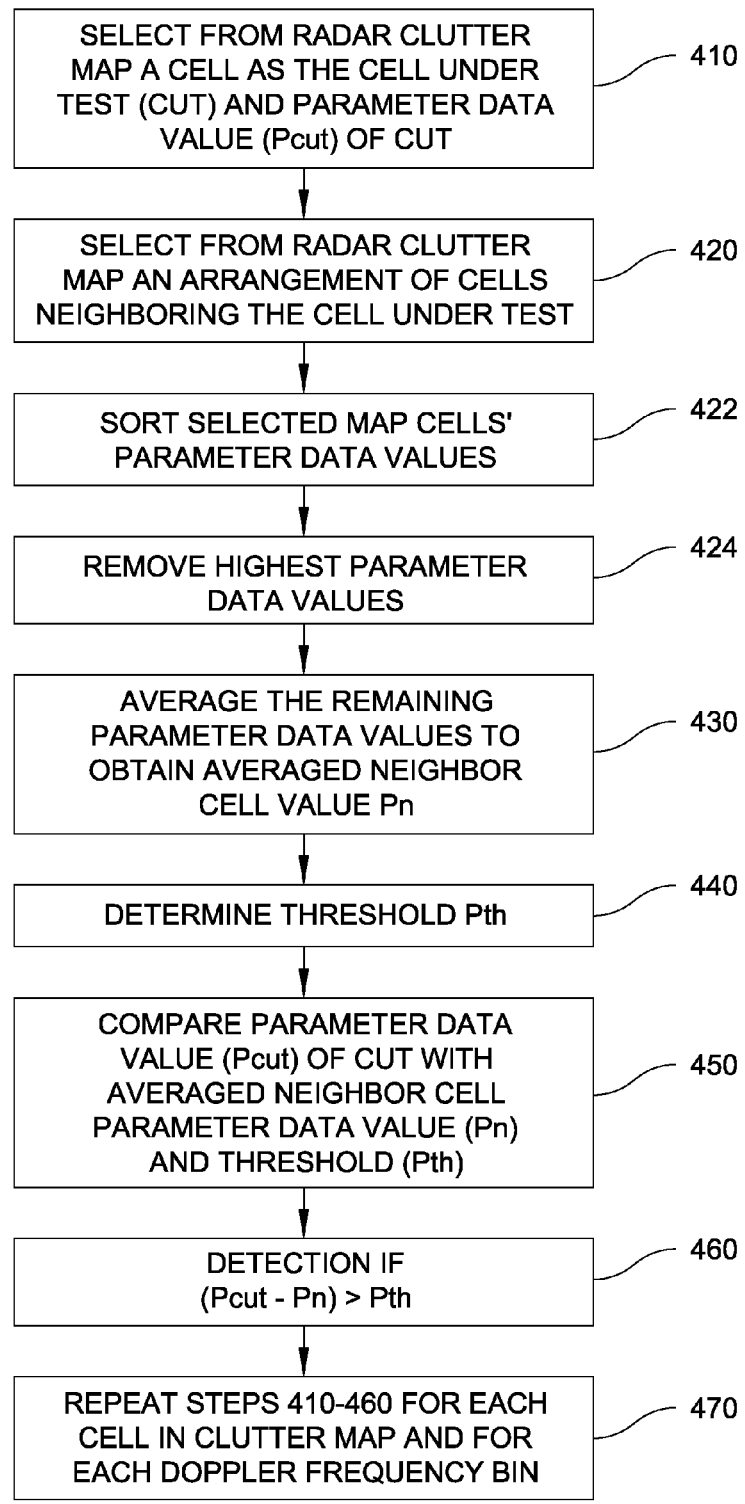
FIG. 4 illustrates a more detailed process flow for secondary CFAR thresholding according to an embodiment of the invention.

FIG. 4 shows an alternative embodiment to the selection of neighboring cells used for processing as described with respect to FIG. 3 wherein a clutter map of averaged radar return power values (associated with each cell in the map) are used to detect sea targets. As shown in the embodiment of FIG. 4, for a given CUT selected from the clutter map (block 410), neighboring map cells are selected according to a predetermined sequence (block 420). The parameter values (e.g. average power values) for each of the selected neighbor cells are retrieved (e.g. from memory) from the clutter map and sorted from highest to lowest (block 422). A predetermined number (e.g. 4) of the neighbor map cells, whose average power values are highest, are removed (block 424) according to one embodiment. In another embodiment, all neighbor map cells whose average power values exceed a given average power value are removed. Removing map cells larger than a pre assigned value mitigates against biasing the detection of the map cells under test. The remaining neighbor cells' parameter values are then averaged (block 430) and the average representative background estimate parameter value $P_n$ is unbiased by either the cell under test or the background neighbor cells. The averaged background estimate parameter value. A threshold value $P_{TH}$ (block 440) is also determined (e.g. 3 dB). A comparison (block 450) is made to the averaged power parameter value $P_{CUT}$ of the CUT derived from the cell under test. If $P_{CUT}$ exceeds the averaged background estimate parameter value $P_n$ by a given threshold value $P_{TH}$, then the system identifies a target detection (block 460) for the given CUT associated with that clutter map. Processing proceeds in the above fashion until the cells within the given clutter map (and corresponding to a particular Doppler frequency bin) are processed (block 470).

Figure 5:
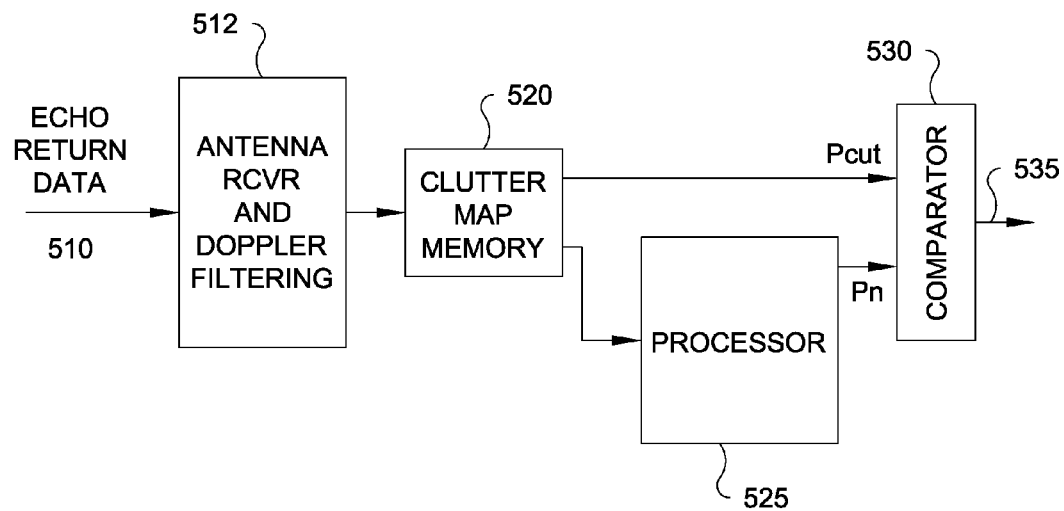
FIG. 5 illustrates a block diagram of an apparatus for a primary and secondary CFAR thresholding according to an embodiment of the invention.

As illustrated in FIG. 5, one embodiment of the invention also relates to apparatus 500 for detecting sea targets using a radar system. Input data 510 from the scan-to-scan rotation of an antenna is received by a receiver element 512 and processed to form a clutter map containing range/azimuth/Doppler bin data of historical averaged data values in memory 520. A processor 525 selects from memory 520 parameter values of a subset of surrounding map cells from the clutter map data according to a given CUT location and averages the surrounding map cell data to provide an averaged parameter value $P_n$. A comparator 530 compares $P_n$ and the average parameter value $P_{CUT}$ and outputs a detection signal 535 indicative of a sea target detection at the CUT when the value of $P_{CUT}$ exceeds $P_n$ by a threshold value $P_{TH}$. The processing sequences automatically through each CUT and each frequency bin to provide a sea target detection process useful for implementation within an air target detection radar system.

In accordance with an exemplary embodiment, processor 525 may, in addition to the averaging functionality described hereinabove, further include sort procedures for sorting the neighboring cell parameter values and removing or thresholding a subset of those neighboring cell parameter values according to a predetermined function, as discussed above and as described with regard to the flow diagrams of FIGS. 3 and 4.

For example, the processor selects cell data from the clutter map representing the average return power measurements from the surrounding environment of the cell under test and (a) sorts the selected parameter values using a sort subroutine (implemented in software, hardware, or combinations thereof) on the basis of the magnitude of the power values from a surrounding environment of the cell under test, and (b) removes using a removal or delete subroutine a subset of the data from selected cells from the surrounding environment of the cell under test based upon whether the magnitude values are larger than a pre assigned measurement value stored in memory. The pre assigned measurement value prevents biasing the detection of the cells under test. The processor then computes the average using an averaging subroutine of the power measurements from the remaining cells to create a sub estimate unbiased by either the cells under test, adjacent target cells or scatterer cells. The comparator compares the measurements derived from the cells under test against the sub estimate to detect the presence of a target within the surveillance region.

As previously mentioned, the subject invention can augment an existing map based air target located at a coastal location to provide a combined, dual use air target and sea target detection system.

Figure 6:
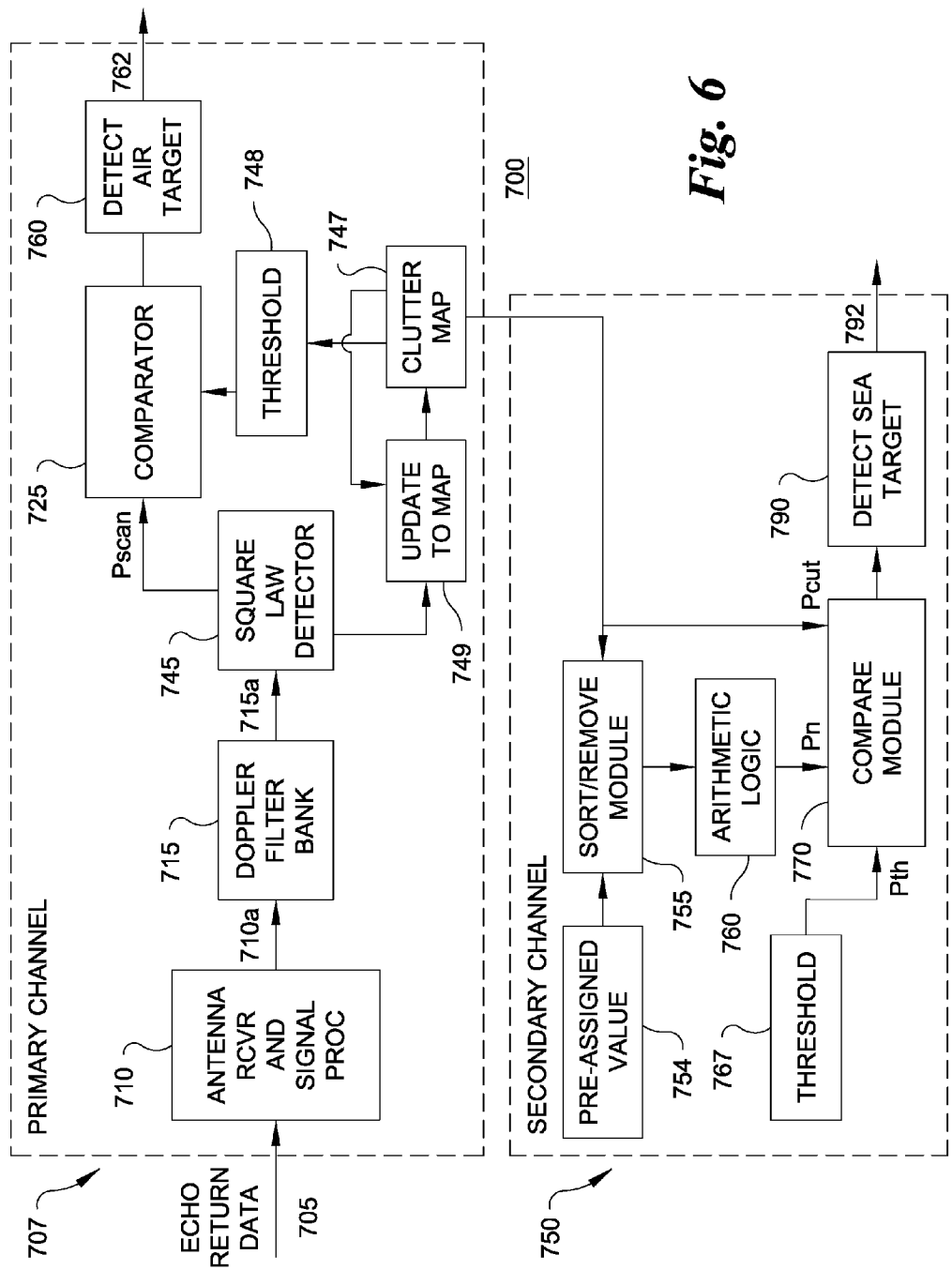
FIG. 6 illustrates a block diagram of a system for CFAR thresholding according to an embodiment of the invention.

FIG. 6 is a block diagram of an augmented CFAR radar system 700 operative for detecting both air targets and sea targets according to an embodiment of the present invention. Radar system 700 includes a primary channel processor 707 for detecting air targets and a secondary channel processor 750 for detecting sea targets. The secondary channel processor 750 utilizes the clutter map data generated as part of the processing and detection of air targets and performs additional processing for the detection of sea targets within the overall air target radar hardware configuration. Furthermore, the augmented CFAR radar system 700 allows for air target and maritime target detection in parallel and/or substantially simultaneously. By determining/declaring targets from both channels, 707 and 750, target detection is accomplished over the sea for all target velocities from zero up to the maximum air target velocity of the radar. Thus, a coastal-based CFAR radar system 700, conventionally an air target radar, by using clutter map based thresholding in the primary channel 707, becomes a combined/dual use air target and sea target radar detection system when implementing the secondary channel 750 and its corresponding processing for sea target detection.

Still referring to FIG. 6, radar return signal data 705 represents the return signal data reflected from the surveillance region and is received by antenna receiver and signal processor assembly 710 according to the scan rate of the radar antenna system. Antenna receiver and signal processing assembly 710 includes amplification circuitry, analog to digital (A/D) circuitry, pulse compression, synchronous processing and other preprocessing circuits as understood in the art and thus shall not be described in further detail for brevity. The output signal 710a from antenna receiver and signal processing assembly 710 in the form of a series of pulses is applied to a Doppler filter assembly 715. Doppler filter assembly 715 may include a series of Doppler filter banks, each associated with a different frequency range. The Doppler filter assembly processes the input signal to a corresponding number of Doppler filter bins, each bin associated with a different frequency and in turn indicative of a different velocity. The output 715a from the Doppler filter assembly represents the I/Q components for each of the filters and is applied to a detector 745 such as a square law detector for obtaining the power signal magnitudes. The Doppler bin powers are converted to a mapping of Doppler bin cells as a function of range/azimuth so as to provide a clutter map 747 for each Doppler bin. As new return data is received (i.e. data 705) in each scan, the data associated with that scan is processed through the Doppler filter assembly and square law detector and, for a given cell under test (CUT), the power associated with the echo data received in that scan Pscan that is associated with that CUT is compared against a threshold of a running average (e.g. historical average) of the same cell under test from the clutter map, as shown in block 725. If the power level of the CUT for the current scan (Pscan) exceeds the background clutter map power average by a given threshold value (block 748) such as 12 dB, then an air target detection (block 760) is declared in the primary channel and a signal 762 indicative of the detection may be stored in memory for further processing and/or applied to a post processing unit for display to a user. Clutter map 747 comprising measurements of average power values associated with each of the cells in the clutter map is updated (block 749) after each threshold test 725. As will be further explained, map 747 is also employed in the secondary channel 750 for sea target detection.

As described above, for each radar scan, the primary channel 707 receives new scanned data in the form or return signal data 705 and which is processed according to the Doppler bin filtering and square law power detection processing (block 745) so as to generate a mapping of cell data for each range/azimuth location and corresponding Doppler bin. Clutter map 747 is initialized during start up. Following map 747 initialization the map data at location (i+1) is updated in accordance with an exponential filter in Doppler filter assembly 715 as follows:

$$map(i+1) = alpha*map(i) + (1-alpha)*filter\_output \quad \text{Equation 1:}$$

Where by way of example and not limitation, a typical value for alpha is 0.9 based on an average power measurement that responds to changes in the environment.

By way of further example, typical ground radar that surveils 360 degrees in azimuth may have 2,000 range bins, 500 azimuth bins and 10 Doppler bins. Ten Doppler bins would result from 10 return pulses forming 10 or more Doppler filters. By way of example, if there were 10 Doppler filters there would be 10 clutter maps, with each map having 2000×500=$10^6$ cells. The entire $10^6$ cells under test in each of the 10 clutter maps undergo the threshold test in block 725 for air target detection (and block 770 of the secondary channel for sea target detection).

Still referring to FIG. 6, each clutter map 747 comprises, for a given Doppler bin, a plurality of cell locations, wherein a parameter (e.g. average power) associated with the time average of the data for that cell location is stored in memory for that particular cell. The secondary channel processing uses the clutter map data to perform additional processing for detecting sea targets as described below.

For example, the clutter map 747 containing the average power return data associated with the surrounding environment of the homogeneous surveillance region is utilized in secondary processor 750 wherein for a selected map cell under test, sort module 755 selects and sorts from the clutter map 747 on the basis of the magnitude of power from cells specified as nearby cells of the map cell under test, and removes cells based upon a preassigned value stored in memory 754 to prevent biasing the detection of the map cell under test. Arithmetic logic module 760 averages the power values associated with the map cells remaining after removal. The computed average of the neighboring map cell data is used with threshold computation module 767 which determines a threshold (e.g. 3 dB) for comparing the average power ($P_{CUT}$) of the selected clutter map CUT with the averaged power value (Pn) of the neighboring clutter map cells. Comparison module 770 such as a comparator operates to compare the clutter map CUT power against Pn and, if the comparison exceeds the threshold $P_{TH}$, a signal indicative of a sea target detection (790) is established. The detection may be stored in memory for further processing and/or applied (via signal 792) to a post processing unit for display to a user. Processing continues for each cell in the clutter map and for each Doppler bin to provide a complete analysis and display of sea target detection data.

In an exemplary embodiment, the map 747 is refreshed for each Doppler filter assembly 715 output. The new outputs from the Doppler filter assembly 715 are thresholded by module 725 against the essentially non-fluctuating clutter map data at the same location for determining air target detection. The clutter map data is then updated with the new output and added to the map 747. This clutter map data is provided to the secondary processor 750 where each clutter map cell (indicative of the average power associated with that cell location) is compared to an average of the neighboring cell map power values.

Figure 7:
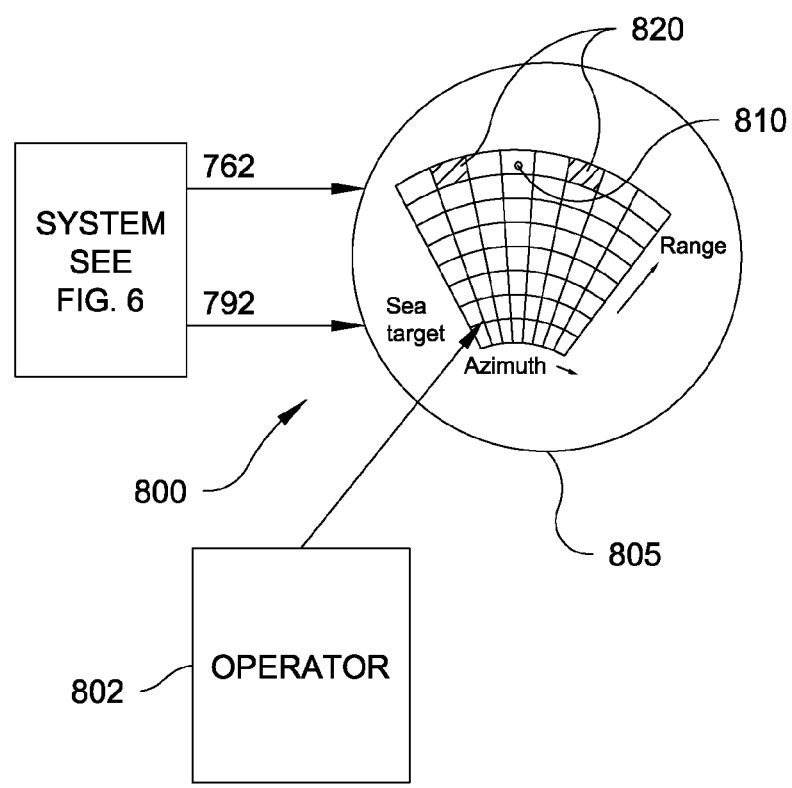
FIG. 7 illustrates a block diagram of a user display system for displaying the results of the CFAR thresholding and target detection according to an embodiment of the invention.

FIG. 7 shows a schematic illustration wherein a trained radar operator views a display device 805 such as a computer monitor that displays the foregoing detections in accordance with the augmented CFAR radar system 700 in order to enable the observation of detected sea targets (and air targets). A range/azimuth display 805 may include a map where power is converted into a colored array of pixels. The location of a weak target of about 3 dB greater than the sea clutter power may be discernable by a radar operator.

As shown in FIG. 7, and with reference to FIG. 6, target detection outputs 762, 790 are provided to a radar display 805 where a relatively small difference in radar cross section of an object 810 is detected and visibly discernible to operator 802. Because of the ergodic nature of the sea clutter, the clutter map of the sea will not change appreciably from range/azimuth cell to nearby range/azimuth cell. However, a radar operator 802 viewing display 805 sees a clutter map having a color change created by an object on the surface of the sea, such as by way of example, a buoy or a small boat as indicated by sea target 810. An aircraft target 820, also displayed on display 805, may simultaneously be viewed by the operator.

With reference to FIG. 2 through FIG. 7, it is understood that the processing and associated processors used in determining, computing, selecting and/or measuring return signal data parameters and clutter map data can be implemented in hardware, software, firmware, or combinations thereof. It is also to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. Generally the software processes may exist in a variety of forms having elements that are more or less active or passive. For example, they may exist as software program (s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals are signals that a computer system hosting or running the computer program may be configured to access, including signals downloaded through the Internet or other networks. Examples of the foregoing include distribution of the program(s) on a CD ROM or via Internet download.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a radar system using a radar clutter map comprising a plurality of range-azimuth cells containing parameter data values indicative of time averaged echo returns for affecting alarm threshold levels at range-azimuth locations scanned by the radar system antenna, a method for detecting targets comprising the steps of:
   obtaining from said radar clutter map a first parameter data value associated with a given cell under test (CUT);
   determining a second parameter data value using parameter data values of other neighboring cells from said plurality of range-azimuth cells from said radar clutter map;
   comparing the first parameter data value associated with said CUT with said second parameter data value; and
   generating a signal indicative of a target detection when said first parameter data value exceeds said second parameter data value by a given threshold corresponding to a target false alarm rate.

2. The method of claim 1, wherein said determining said second parameter data value comprises averaging said parameter data values of said other cells.

3. The method of claim 2, wherein said averaging said parameter data values comprises determining the mean value.

4. The method of claim 2, further comprising for each cell in said clutter map, automatically selecting another one of said plurality of cells as said CUT and performing said obtaining, determining, comparing and generating steps for each selected CUT.

5. The method of claim 4, wherein said automatically selecting, obtaining, determining, comparing and generating steps are performed for each of a plurality of frequency ranges.

6. The method of claim 2, wherein said determining further comprises sorting said other cell parameter data values and thresholding a subset of those other cell parameter data values according to a predetermined function, prior to said averaging step.

7. The method of claim 2, wherein said determining further comprises selecting a subset of cells neighboring said CUT according to a predetermined geometrical arrangement, and averaging the parameter data values of said selected subset of cells.

8. The method of claim 1, wherein said CUT first parameter data value is a function of the average radar return power.

9. The method of claim 8, wherein said second parameter data value is an average of the average radar return power values from each of said other cells.

10. The method of claim 9, wherein said target comprises an object on the surface of a body of water.

11. A method for detecting targets using a radar system employing a radar clutter map that comprises a plurality of range-azimuth cells containing parameter data values indicative of time averaged echo returns for affecting alarm threshold levels at range-azimuth locations scanned by the radar system antenna, the method comprising the steps of:
   selecting a subset of cells from said clutter map based on a geometrical relation to a selected cell under test (CUT);
   removing cells from said subset if the magnitude of their power levels is greater than a predetermined value;
   averaging the power levels of the remaining cells from said subset to create a sub-estimate value unbiased by one of either the cell under test or cells whose power levels exceed said predetermined value;
   comparing the sub-estimate value with the average power level value of the CUT to detect the presence of a target.

12. The method of claim 11, further comprising sorting selected cells from said subset based upon power levels.

13. The method of claim 11, further comprising updating said radar clutter map with return signal data for each antenna scan.

14. The method of claim 11, wherein the presence of a target is detected when the average power level of the CUT exceeds the sub-estimate value by a threshold value.

15. The method of claim 14, wherein the threshold value is 3 decibels (dB).

16. In a system using a radar clutter map comprising a plurality of range-azimuth cells containing parameter data values indicative of time averaged echo returns for affecting alarm threshold levels at range-azimuth locations scanned by the radar system antenna, an apparatus for detecting targets comprising:

a processor adapted to obtain from said radar clutter map a first parameter data value associated with a given cell under test (CUT), said processor including a logic unit that determines a second parameter data value using parameter data values of other cells from said plurality of range-azimuth cells from said radar clutter map;

a comparator that compares the first parameter data value with said second parameter data value and generates a signal indicative of a target detection when said first parameter data value exceeds said second parameter data value by a given threshold corresponding to a target false alarm rate.

17. The system of claim 16, further comprising:

an antenna receiver responsive to return echo signals associated with a given radar scan and outputting digital pulses indicative of said return echo signals;

a Doppler filter assembly responsive to said digital pulses for providing I and Q components for Doppler frequency mapping of said pulses according to range and azimuth coordinates;

a primary channel processor responsive to said I and Q components for determining instantaneous power of a given cell under test (CUT) for said given radar scan;

a primary channel comparator for comparing said determined instantaneous power of said given cell under test with the first data parameter value of said clutter map of said given cell under test and generating a signal indicative of detection of a target when said instantaneous power exceeds said data parameter value of said clutter map given by a threshold value.

18. The system of claim 17, wherein said clutter map data parameter values are updated responsive to said primary channel comparator.

19. The system of claim 17, wherein said primary channel processor comprises a magnitude detector responsive to said Doppler filter assembly for determining the average power contained within said digital pulses.

20. The system of claim 17, further comprising a display responsive to the outputs of said comparator and said primary channel comparator for displaying targets.

* * * * *